June 9, 1931.  G. A. LUTHER  1,809,051
ROTARY ENGINE
Filed Jan. 16, 1926  4 Sheets-Sheet 1
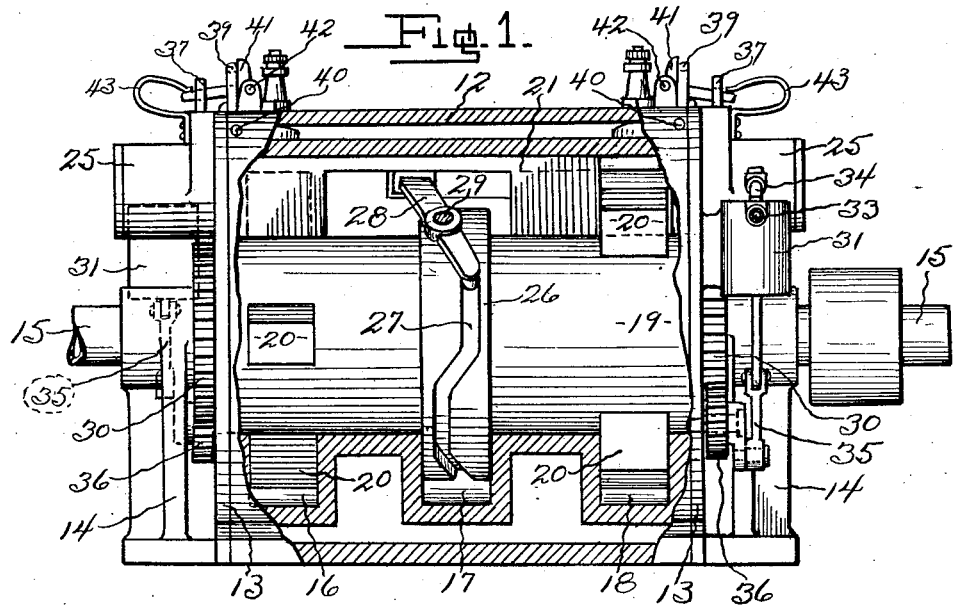
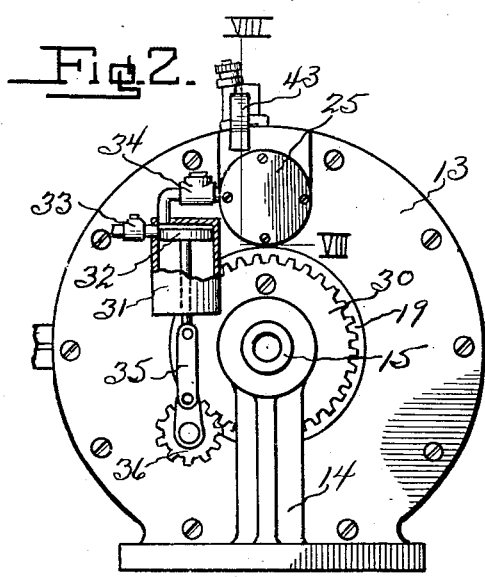
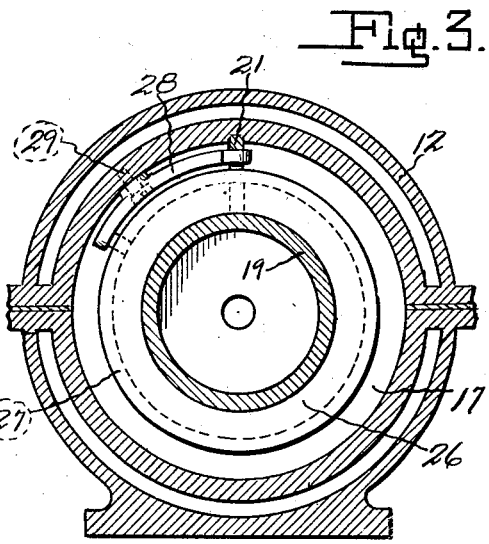
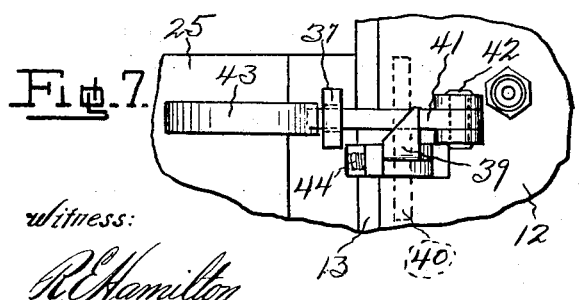
INVENTOR.
George A. Luther June 9, 1931.  G. A. LUTHER  1,809,051
ROTARY ENGINE
Filed Jan. 16, 1926  4 Sheets-Sheet 2
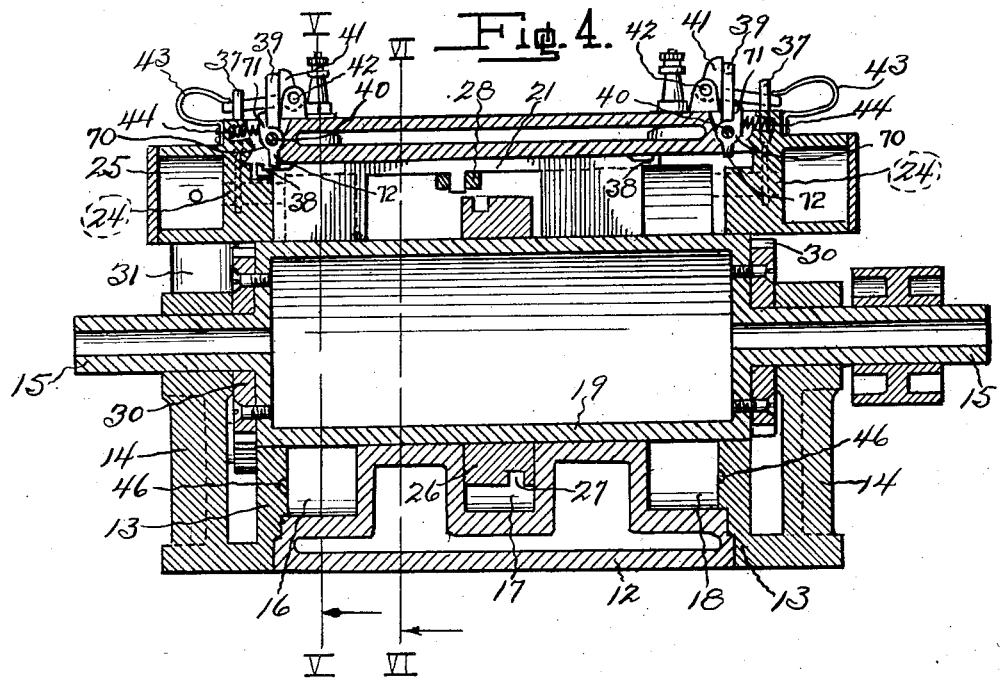
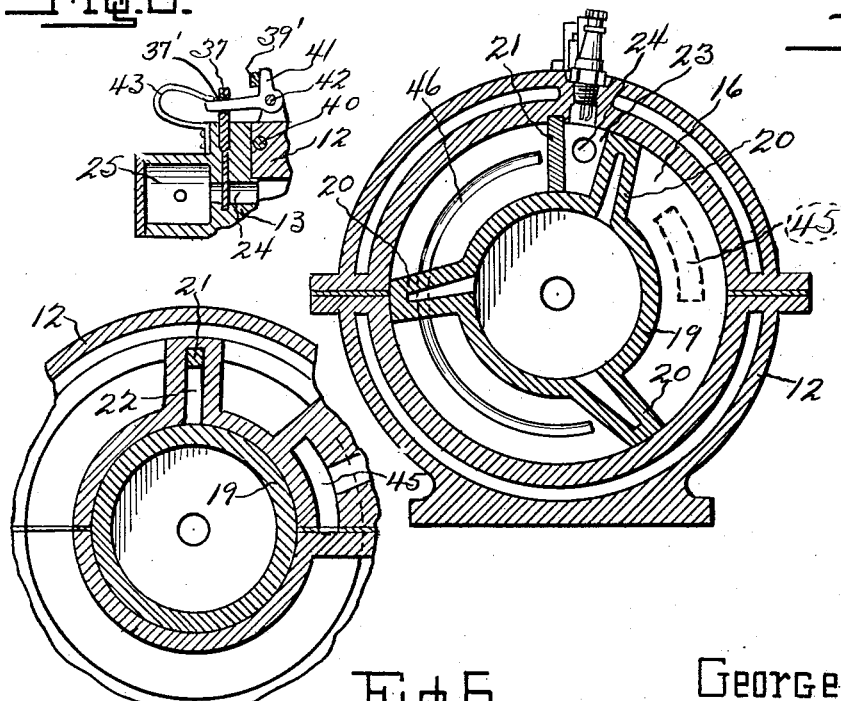
INVENTOR.
George A. Luther
BY
ATTORNEY.
Witness:
R. E. Hamilton June 9, 1931.  G. A. LUTHER  1,809,051
ROTARY ENGINE
Filed Jan. 16, 1926   4 Sheets-Sheet 3

INVENTOR.
George A. Luther
BY
ATTORNEY.

Witness:

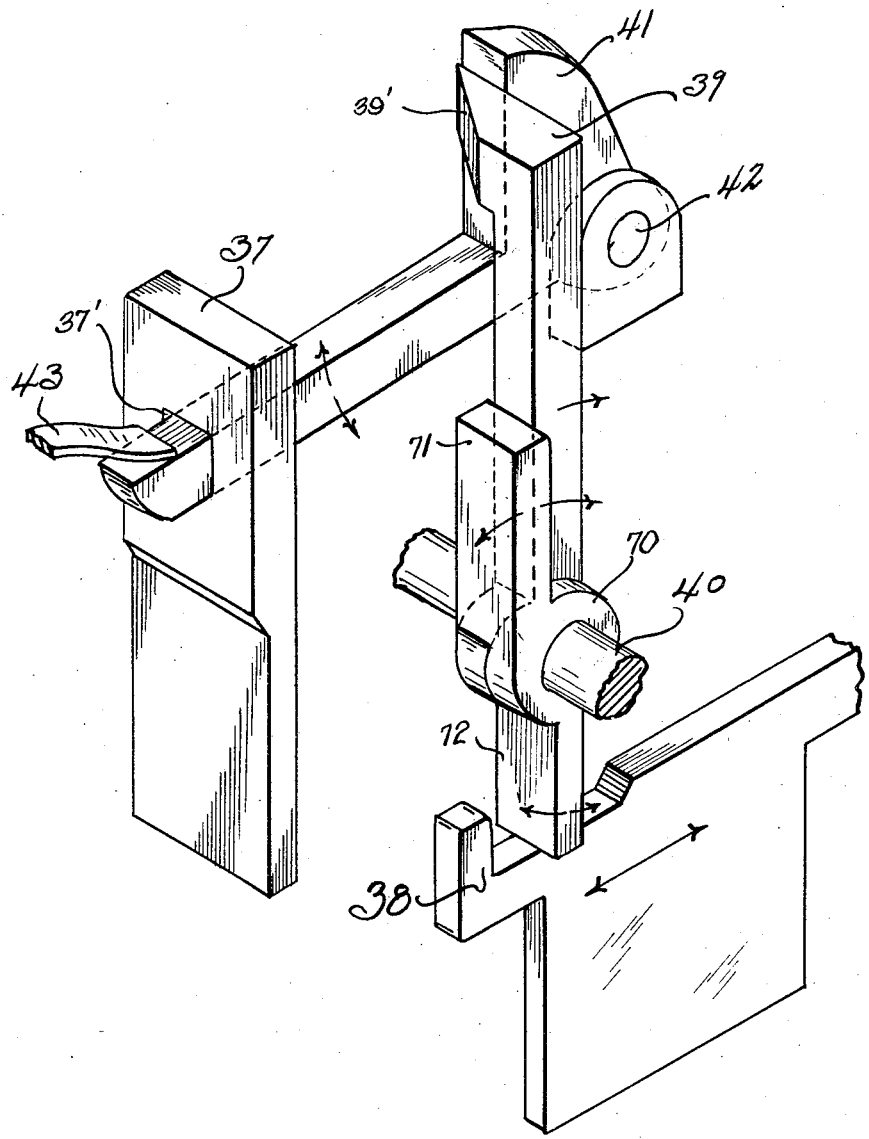

Patented June 9, 1931

1,809,051

UNITED STATES PATENT OFFICE

GEORGE A. LUTHER, OF KANSAS CITY, KANSAS

ROTARY ENGINE

Application filed January 16, 1926. Serial No. 81,615.

This invention relates to rotary engines, and has for its primary object the provision of a structure which may be used effectively with either steam of combustible fuel.

One of the main objects of the instant invention is to provide an extremely simple device which is compact, not expensive to make, not likely to get out of order and will operate efficiently by developing the maximum amount of power from a minimum of fuel.

A further object of my invention is the contemplation of a rotary engine that is simple in-so-far as the number of parts and their combination is concerned, and which includes new and novel means of actuating an abutment member.

An even further object of the invention is the provision of a rotary engine which actuates the valve mechanism thereof directly from the abutment member without the use of complicated gearing or the like.

Many minor objects will appear during the course of the detailed specification referring to the accompanying drawings, in which:

Figure 1 is a side elevation of a rotary engine made in accordance with my invention and having a part of the casing broken away for clearness.

Fig. 2 is an end view of the engine.

Fig. 3 is a vertical cross section of the same taken on a line extending through the engine in the plane of the right side of drum 26, Figure 1.

Fig. 4 is a vertical central section of the device.

Fig. 5 is another cross section of the engine taken on line V—V of Fig. 4.

Fig. 6 is a fragmentary cross section taken on line VI—VI of Fig. 4.

Fig. 7 is an enlarged detailed plan view of the trigger mechanism used in actuating the intake valve.

Fig. 8 is a fragmentary sectional view of the intake valve and trigger mechanism taken along line VIII—VIII of Fig. 2.

Figure 9:
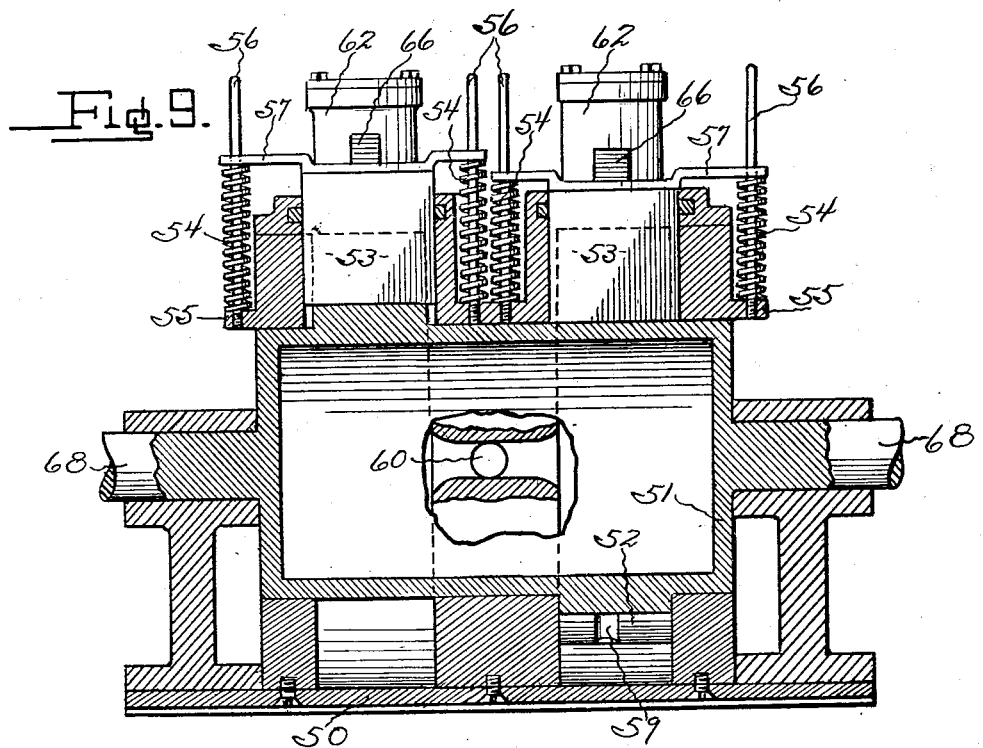
Fig. 9 is a vertical central section of a modified form of construction.

Referring at this time to the drawings in detail, and particularly to that form of the invention shown in Figs. 1 to 8 inclusive, the numeral 12 designates the casing of the engine which is closed by end members 13 which also form bearings 14 for the drive shaft 15.

Casing 12 is constructed to provide three annular chambers 16, 17 and 18 respectively, which are positioned as shown in Figs. 1 and 4, and which extend around rotor 19 carried within casing 12. Radially extending blades 20 are formed by rotor 19 near each end. These blades at one end must be staggered with relation to the blades at the other end as shown in Fig. 1 to permit of the action of an abutment member 21 which is slidably mounted in longitudinal slot 22, formed by casing 12 above rotor 19. This member 21 alternately cooperates with the successive blades 20 at each end of rotor 19 to form a combustion chamber 23 therebehind, immediately prior to the explosion of compressed fluid which has entered through port 24 from storage chamber 25, carried by each end of the engine.

To reciprocate member 21 at the proper time, a drum 26, carried by rotor 19 intermediate the ends thereof and in annular chamber 17 is formed to present a cam groove 27 which extends around the annular face thereof and which engages one end of arm 28 as shown in Figs. 1 and 3. This arm 28 is pivotally mounted intermediate its ends as at 29 to casing 12, and engages abutment member 21 at its upper end. Thus, when rotor 19 is turning, the member 21 is reciprocated and caused to form a combustion chamber first behind a blade 20 at one end of rotor 19 then behind a blade 20 at the opposite end.

The ends of rotor 19 extend through end members 13 of casing 12, and carry a gear 30 which drives pump 31 as shown in Fig. 2. The fluid may be drawn into pump 31 by piston 32 through conduit and check valve 33 and then forced into storage chamber 25 through pipe and check valve 34. Linkage 35 and pinion 36 may be altered to suit the stroke desired, but it is preferred to place pump 31 as near chamber 25 as possible.

Each end of member 21 is provided with an upturned lug 38 as clearly shown in Figures 4 and 11. The valve 37 is provided with an opening 37′ through which one arm of a bell crank lever 41 extends. Bell crank lever 41 is carried by casing 12 and pivotally mounted on a pin 42 in such a manner that when it is oscillated it will move the valve 37 to open and close the port 24. Intermediate bell crank lever 41 and member 21 is a shaft 40 mounted in casing 12 on which is pivotally mounted a lever arm 39 having a transverse projection 39′ which is disposed in the path of movement of one of the arms of bell crank lever 41′. A lever 70 pivoted on shaft 40 intermediate its ends adjacent lever 39 has a portion 71 which overlaps lever 39 so that when it is operated as hereinafter described, it will engage lever 39 to oscillate it so as to cause the valve 37 to be opened. The lower portion 72 of lever 70 extends in the path of the upturned portion 38 so that as 38 moves outwardly it engages the inner side of lever portion 72 thus causing 71 to engage the outer side of lever 39 and cause it to oscillate in such a manner that 39′ will engage one arm of lever 41 thus causing the other arm of 41 to lift the valve 37 to open the port 24.

When 38 has moved outwardly a predetermined distance and the valve 37 is in the open position 72 will due to its oscillation, slide out of the path of 38 and be returned to its normal position by the action of the expansion spring 44 which is extended as 71 is moved inwardly. When lever 70 is returned to its normal position the spring 43 acts downwardly on 41 thus causing 41 to move the valve 37 to the closed position. The above described valve action takes place as the member 21 is nearing the end of its stroke and immediately after valve 37 has closed port 24, the explosion takes place which exerts a driving force against the face of blade 20. As the rotor 19 turns, the exhaust gases are carried to exhaust port 45, where it leaves casing 12.

A by-pass groove 46 may be formed in the side of each of annular chambers 16 and 18, which will release any collected exhaust gases by permitting the same to work back therethrough to finally discharge into a chamber formed by the casing 12 and rotor blades 20 which communicates with exhaust port 45.

Packing of any suitable nature or kind may also be provided which will effectively perform the function of making the several joints tight. The rotor 19, shaft 15 and walls of casing 12 should be made hollow to permit the introduction of a cooling medium to the engine, and any means of lubrication may be utilized.

By eliminating certain members of the device just described, a rotary engine may be made which is propellable by steam or the like. To effectively provide for this point, however, the modified form of the invention may be described which is especially adapted for the use of steam.

Figure 10:
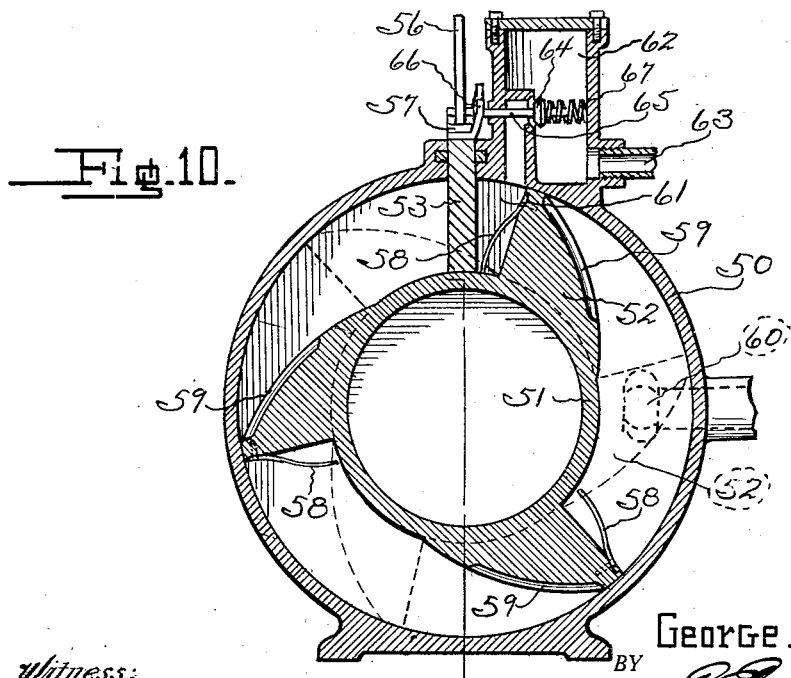
Fig. 10 is a vertical cross section of Fig. 9 taken through the center of one of the chambers 62, and, Fig. 11 is an enlarged diagrammatical detail of the inlet valve mechanism.

With particular reference to Figs. 9 and 10, the engine is here shown to consist of a casing 50, within which is carried a rotor 51 having a series of blades 52 adjacent each end. These two series blades are in staggered relation to each other, and are formed to present an inclined surface which lifts the abutment members 53 as the rotor turns.

In this instance, there are two abutments 53 disposed at the top of casing 50 which are constantly urged to the closed position by springs 54. These springs 54 are secured at their bottom end to a lug 55 formed by casing 50, and coil about a guide pin 56. Their upper ends are secured to arms 57 which extend outwardly from the top edge of each abutment 53 as shown in Fig. 9. As the abutment is carried upwardly by the inclined surface of blade 52, springs 54 are flexed. As soon as the flat edge of the blade 52 is reached, the springs 54 immediately snap the abutment member 53 down against the rotor 51 as shown in Fig. 10. To eliminate jar and to "ease" the fall of member 53, flat springs 58 are carried by the abrupt side of each blade 52. Bottom of member 53 strikes these springs and lowers with less force. In the inclined face of each blade 52 is a groove 59 which permits any exhaust gas, which has been carried around past exhaust port 60, to escape back to the opposite side of member 53 as it rides up over the inclined surface of blade 52 and not be carried into chamber 61 which is formed behind each blade when member 53 falls.

Steam is preferably used in the operation of this device, and storage chamber 62 receives its supply through any suitable means such as conduit 63. A valved port 64 interconnects chamber 62 and the chamber 61, and valve 64 controls the passage of steam from one to the other.

To automatically operate this valve 64 as soon as chamber 61 has been formed by the dropping of member 53, its stem 65 is disposed to extend out in the path of actuating arm 66, carried at the top of each member 53. Arm 66 has an inclined face and pushes inwardly on stem 65 to open valve 64 against the tension of a coil spring or the like 67. When the inclined face of the next succeeding blade 52 starts lifting member 53, valve 64 is permitted to close.

The action just set forth takes place alternately at each end of rotor 51, and an even power is imparted to drive shaft 68 which may be connected to any work.

It should be noted that the simplest and most compact form of construction is shown.

Having thus described my invention, to the details of which it is desired not to be limited, what I claim and desire to secure by Letters Patent is:

1. In a rotary engine of the character described, a casing, a rotor therein having a plurality of staggered spaced apart blades extending radially therefrom, an abutment adapted to be moved into successive cooperation with each blade to form a combustion chamber therebehind, a fuel storage chamber carried by said casing adjacent the formed combustion chamber, a valve joining said chambers and means for opening said valve when the adjoining combustion chamber has been formed including a series of levers disposed to co-act to impart opening and closing movement to said valve, said series of levers being directly actuated by said abutment member as it reaches a position behind each blade and to permit the passing thereof out of such position without moving said valve.

2. In a rotary engine of the character described, a casing, a rotor therein having a plurality of staggered spaced apart blades extending radially therefrom, an abutment member adapted to be moved into successive cooperation with each blade to form a combustion chamber therebehind, a fuel storage chamber carried by said casing adjacent the formed combustion chambers, a valve joining said chambers and means for operating said valve when the adjoining combustion chamber has been formed including a series of levers adapted to be actuated by said abutment member as it reaches a position behind each blade successively and resilient means for maintaining said levers in their operative position and said valve in the closed position when said abutment member is out of said position behind each blade.

3. A rotary engine comprising, in combination, a casing, having three annular chambers formed therein, a rotor having a plurality of blades extending radially therefrom in staggered relation, said blades disposed in two series adjacent each end respectively of said rotor and adapted to travel in two of said grooves, a drum carried by said rotor intermediate the ends thereof and adapted to travel in the third groove, a cam groove formed in the annular face of said drum, an abutment member slidably supported by said casing between said series of blades, a pivotally mounted arm actuated by said cam grooves for reciprocating said abutment member, fluid supply means carried by each end of said casing and actuated by said rotor, a valve connecting said fluid supply means and the respective grooves adjacent the ends of the casing and means, including a series of co-acting levers adapted to be operated when said abutment member nears the end of each reciprocation for actuating said connecting valve.

In testimony whereof I hereunto affix my signature.

GEORGE A. LUTHER.